US012774806B2

(12) United States Patent
Gorkovenko et al.

(10) Patent No.: US 12,774,806 B2
(45) Date of Patent: Oct. 27, 2026

(54) ILLUMINATING DOOR HANDLE

(71) Applicant: ASSA ABLOY AMERICAS RESIDENTIAL INC., New Haven, CT (US)

(72) Inventors: Elena Gorkovenko, Mission Viejo, CA (US); Steven Andrew Moore, Yorba Linda, CA (US); Oscar Romero, Lake Forest, CA (US); Kevin Pasma, Lake Forest, CA (US); David Downey, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 48 days.

(21) Appl. No.: 18/505,663

(22) Filed: Nov. 9, 2023

(65) Prior Publication Data

US 2024/0151391 A1 May 9, 2024

Related U.S. Application Data

(60) Provisional application No. 63/383,065, filed on Nov. 9, 2022.

(51) Int. Cl.
*F21V 33/00* (2006.01)
*E05B 1/00* (2006.01)
(Continued)

(52) U.S. Cl.
CPC ............ *F21V 33/006* (2013.01); *E05B 1/003* (2013.01); *F21S 9/02* (2013.01); *F21V 23/0464* (2013.01);
(Continued)

(58) Field of Classification Search
CPC ............... F21V 33/006; F21V 23/0464; F21V 23/0471; E05B 1/003; F21S 9/02; F21Y 2115/10
See application file for complete search history.

(56) References Cited

U.S. PATENT DOCUMENTS 2,438,847 A * 3/1948 Dreese .................... E05B 17/10 362/100
2,760,050 A * 8/1956 Porsche .................. E05B 17/10 362/100
(Continued)

FOREIGN PATENT DOCUMENTS

CN 201517306 U 6/2010
CN 215108033 U 12/2021
(Continued)

OTHER PUBLICATIONS

PCT International Preliminary Report on Patentability in issued in PCT Application PCT/US2023/079203 mailed May 22, 2025, 8 pages.
(Continued)

*Primary Examiner* — Mark A Williams
(74) *Attorney, Agent, or Firm* — Merchant & Gould P.C.

(57) ABSTRACT

A door handle includes a handle body with an interior cavity, the interior cavity having an opening. The door handle includes an at least semi-translucent cover to substantially enclose the opening and the interior cavity. The door handle includes a light-emitting diode. The light-emitting diode is configured to emit light out through an at least semi-translucent cover.

14 Claims, 17 Drawing Sheets

(51) Int. Cl.

| | |
|---|---|
| ***F21S 9/02*** | (2006.01) |
| ***F21V 23/04*** | (2006.01) |
| *F21Y 115/10* | (2016.01) |

(52) U.S. Cl.

CPC ....... *F21V 23/0471* (2013.01); *F21Y 2115/10* (2016.08)

(56) References Cited

U.S. PATENT DOCUMENTS

| | | | | |
|---|---|---|---|---|
| 6,164,805 | A * | 12/2000 | Hulse .................. | B60Q 1/2669 362/501 |
| 6,729,740 | B1 | 5/2004 | Gazard | |
| 10,342,090 | B2 | 7/2019 | Noeldner | |
| 10,544,603 | B1 * | 1/2020 | Harripersaud ........ | E05B 17/106 |
| 10,669,740 | B2 | 6/2020 | Szerszen | |
| 11,339,583 | B2 | 5/2022 | Watson et al. | |
| 2004/0062047 | A1 | 4/2004 | Camarota et al. | |
| 2010/0219957 | A1 * | 9/2010 | Jolley ..................... | E05B 17/10 362/100 |
| 2012/0106182 | A1 | 5/2012 | Minter et al. | |
| 2013/0107557 | A1 * | 5/2013 | Dingman ................. | B60Q 3/80 362/501 |
| 2013/0263633 | A1 * | 10/2013 | Minter .................... | E05B 17/10 70/432 |
| 2014/0001779 | A1 * | 1/2014 | Bedoian .................. | E05B 47/00 292/336.3 |
| 2017/0175994 | A1 | 6/2017 | Kowash et al. | |
| 2018/0160498 | A1 * | 6/2018 | Noeldner ............... | H05B 45/10 |
| 2019/0106051 | A1 * | 4/2019 | Huizen ................... | F21S 43/26 |
| 2020/0270900 | A1 * | 8/2020 | Lin ......................... | E05B 17/10 |
| 2021/0189761 | A1 * | 6/2021 | Watson ................. | E05B 1/0007 |
| 2022/0241443 | A1 | 8/2022 | Krzeminski et al. | |
| 2025/0237083 | A1 | 7/2025 | Okhovat et al. | |

FOREIGN PATENT DOCUMENTS

| | | | |
|---|---|---|---|
| CN | 219993387 | U | 11/2023 |
| DE | 202015106590 | A1 | 1/2016 |
| DE | 102015003027 | A1 | 2/2017 |
| KR | 200160637 | Y1 | 11/1999 |
| KR | 102333113 | B1 | 12/2021 |
| KR | 20240080241 | A | 6/2024 |
| WO | 2017044943 | A1 | 3/2017 |
| WO | 2024115884 | A1 | 6/2024 |

OTHER PUBLICATIONS

Search Report and Written Opinion issued in related application No. PCT/US2023/079203 on Feb. 29, 2024.

* cited by examiner

ILLUMINATING DOOR HANDLE

CROSS-REFERENCE TO RELATED APPLICATIONS

This application claims priority to U.S. Provisional Patent Application No. 63/383,065 filed Nov. 9, 2022, the disclosure of which is incorporated herein by reference in its entirety.

TECHNICAL FIELD

This invention relates to the field of handles. More particularly, this invention relates to illuminating door handles.

BACKGROUND

Door handles and doorknobs are commonplace throughout the home. Typical handles and knobs are rotatable to selectively release a door latch, allowing a user to open a door. In the context of door handles positioned on doors within a building (e.g., residential premises, such as a house, apartment, or the like), such door handles may be positioned on doors that separate rooms for privacy or passage purposes. This includes separation of bedrooms from common areas, bathrooms, and the like.

It is often the case that individuals move within premises at night or when overhead lights are turned off. In such cases, individuals may try to navigate through premises without turning overhead lights on, e.g., to avoid disturbing others at night, or simply due to inconvenience of a light switch location. In these cases, individuals may have trouble determining the exact location of a door or door handle, leading the individual to fumble in darkness in an attempt to locate the door handle and open the door, allowing the individual to move among rooms within the premises.

SUMMARY

In general, the present disclosure relates to a handle. In example embodiments, a handle may have a handle body which is rotatable to move a latch between an extended position and a retracted position. The handle body may have an interior cavity. The interior cavity may be used to house electrical components, and accommodate at least a portion of a lighting assembly and circuit.

In a first aspect, a door handle is disclosed that has a handle body a handle body operatively attachable to a spindle of a handleset, the handle body having a grippable portion and, when installed at a door, being rotatable to move a latch between an extended position and a retracted position. The interior cavity has an opening. The door handle includes a battery housed in the interior cavity. The door handle also includes an illumination circuit comprising a light sensor circuit, a light emitting diode, and a control circuit electrically connected to the battery, the light sensor circuit, and the light-emitting diode, wherein the control circuit activates the light-emitting diode for at least a portion of time during which the light sensor circuit indicates that ambient light is below a threshold, and maintains the light-emitting diode in an inactive state in response to the light sensor circuit indicating that ambient light is above the threshold, wherein the light-emitting diode is illuminated during at least a portion of time the light-emitting diode is operated in the activatable state. The door handle also includes an at least semi-translucent cover configured to cooperate with the opening and substantially enclose the illumination circuit, the light-emitting diode being positioned to emit light through the at least semi-translucent cover, In a second aspect, a cabinet pull device is disclosed for mounting to a front panel of a cabinet, the front panel having an exterior side and an interior side. A handle is mounted on an exterior side of the front panel the handle having a body, the body including an interior cavity having an opening. A power source is mounted on the interior side of the front panel. A light sensor circuit configured to monitor the ambient light in a room on the exterior side of the front panel and a light emitting diode are positioned within the interior cavity of the handle. A light-emitting diode control circuit activates the light-emitting diode during at least a portion of time during which a signal is received from the light sensor circuit indicating that ambient light is below a threshold. The light-emitting diode control circuit deactivates the light-emitting diode in response to a signal from the light sensor circuit indicating that ambient light is above the threshold. The cabinet pull device also includes an at least semi-translucent cover. The at least semi-translucent cover is configured to cooperate with the opening and enclose the light sensor circuit, the light-emitting diode, and the interior cavity.

In a third aspect, a door handle is disclosed. The door handle includes a handle body operatively attachable to a spindle of a handleset, the handle body having a grippable portion and, when installed at a door, being rotatable to move a latch between an extended position and a retracted position. The handle body includes an interior cavity, the interior cavity housing a circuit including a battery, a light sensor circuit, and a light-emitting diode The light-emitting diode is configured to operate in response to a signal originating from the light sensor circuit. The door handle further includes an at least semi-translucent cover configured to substantially enclose the interior cavity.

In a further aspect, a method of changing a battery in a door handle is disclosed. The method includes removing an at least semi-translucent cover from a handle body; inserting a battery through an opening of an interior cavity of the handle body; and reattaching the at least semi-translucent cover to the handle body.

In a still further aspect, a method of installing a door handle is disclosed. The method includes mounting a handle body on a first side of a door, the handle body having an interior cavity with an opening; inserting a battery through the opening to house the battery in the interior cavity; and attaching an at least semi-translucent cover to the handle body to substantially enclose the interior cavity.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1A:
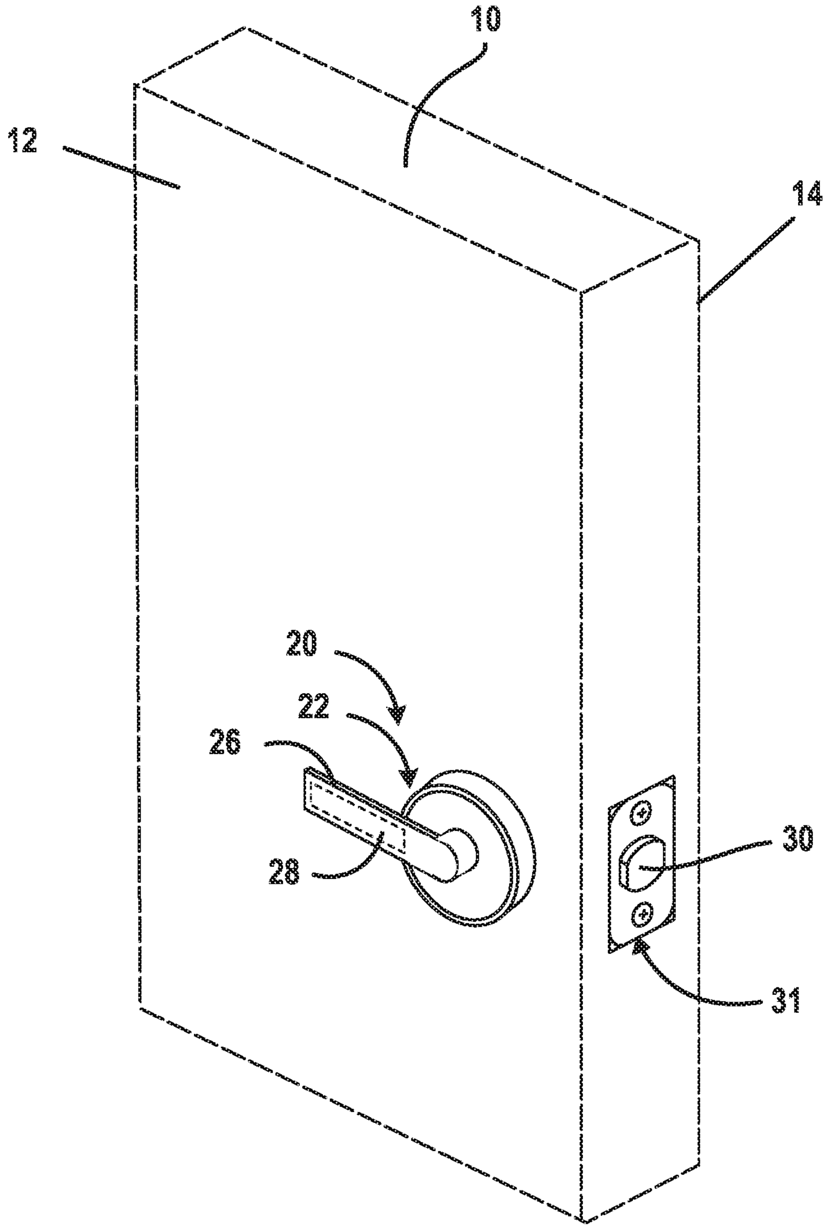
FIG. 1A illustrates a perspective view of a first face of a door having a handle installed thereon.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used herein, “handle” can mean any object used for opening doors, cabinets, drawers, or similar barriers, including handles and knobs. The term “including” as used herein should be read to mean “including, without limitation,” “including but not limited to,” or the like. The term “substantially” as used herein is a broad term and is to be given its ordinary and customary meaning to a person of ordinary skill in the art (and is not to be limited to a special or customized meaning), and furthermore refers without limitation to being largely but not necessarily wholly that which is specified.

As briefly described above, embodiments of the present invention are directed to a door handle. In example embodiments, a door handle may include a light-emitting diode (LED). The LED may provide illumination to the handle, the door to which the handle is attached, or both. By providing this illumination, individuals will be able to identify the exact location of the door or door handle in low-light conditions. Accordingly, individuals may more easily move among rooms without needing to turn on overhead lights.

In some example aspects, the handle includes an interior cavity within the body of the handle, which may house electrical components. These electrical components may include an LED and a battery. By including the electrical components in the interior cavity, the handle is rotatable without the risk of damaging the electrical components or the wires connecting the electrical components.

In some example aspects, the interior cavity houses additional electrical components. This may include some combination of sensors in connection with the LED, such as light sensors or motion sensors. By incorporating sensors into the handle, the LED may be selectively illuminated, reducing the amount of energy consumed by the handle and extending the time before a battery would need to be replaced.

Figure 1B:
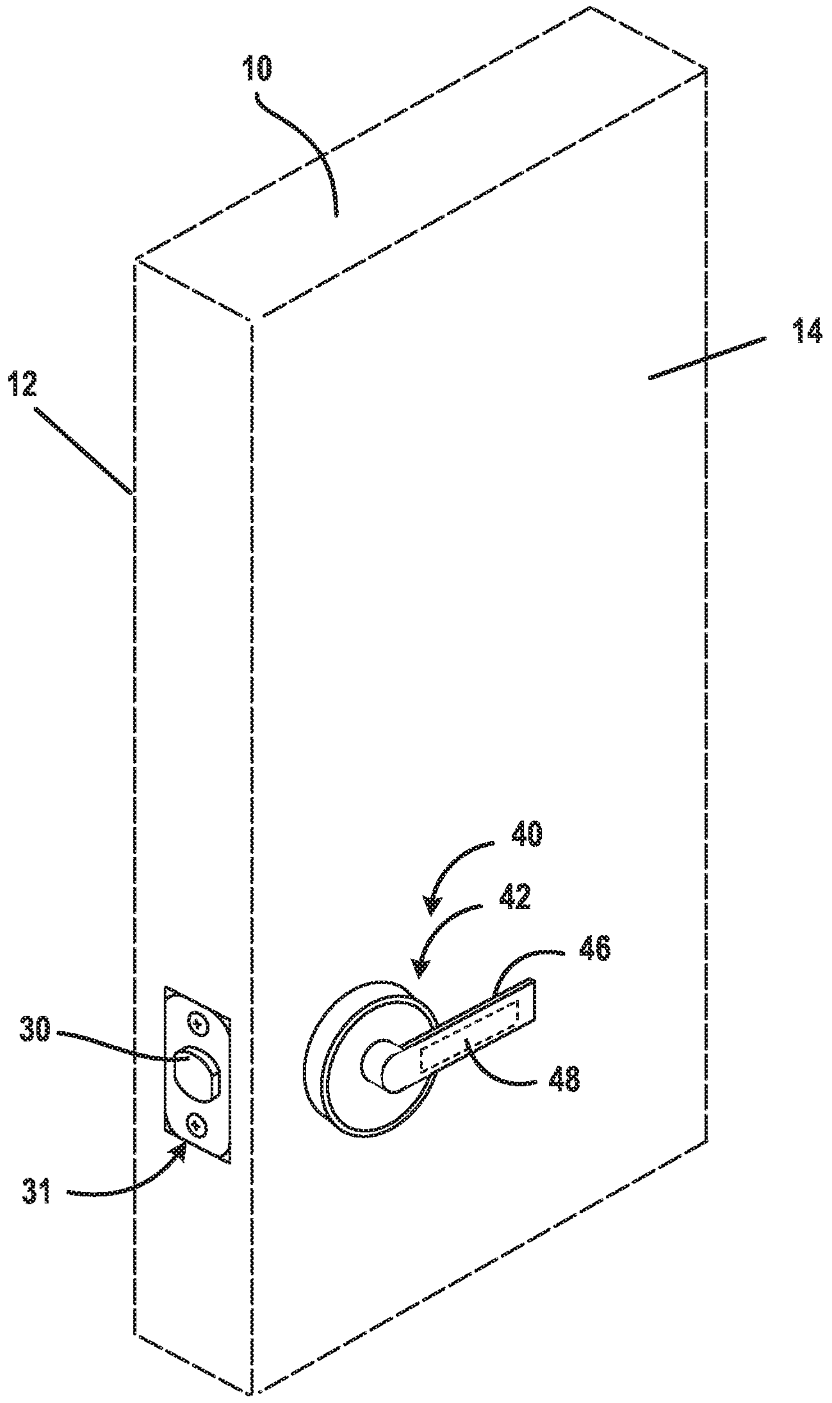
FIG. 1B illustrates a perspective of a second face of the door of FIG. 1A having a handle installed thereon.

Turning first to FIGS. 1A and 1B, aspects of a door handle 20 are shown. In the embodiment illustrated in FIG. 1A, the handle 20 is mounted on a first face 12 of a door 10. The handle 20 has a handle body 26 which is rotatable relative to the door 10 to selectively extend or retract a latch 30 positioned within a crossbore 31 on an edge of the door 10. The handle 20 may include a decorative escutcheon, or rose, illustrated as escutcheon 22.

In the example shown, the handle body 26 has an interior cavity 28. As discussed in further detail below, the interior cavity 28 may be used to house electrical components. In an embodiment, the electrical components include a battery. In alternative embodiments, the electrical components can additionally include at least one of an LED, a light sensor circuit, a printed circuit board, a controller, a motion sensor, and a wireless network interface. Additional electrical and non-electrical components may also be housed in the interior cavity 28.

FIG. 1B illustrates a view of a second face 14 of the door 10. In this example, a further handle 40 with a rotatable handle body 46 that selectively extends or retracts the latch 30 may by mounted on the second face 14 of the door 10. The handle 40 may include a decorative escutcheon, or rose, illustrated as escutcheon 42, analogously to escutcheon 22 associated with handle 20. In an embodiment, the handle body 46 has an interior cavity 48 that may house similar components to the components described above. In alternative embodiments, the handle body 46 does not have an interior cavity.

In the embodiment depicted in FIGS. 1A and 1B, the door handles 20, 40 may, along with escutcheons 22, 42, and latch 30, form a handleset. Additionally, the first face 12 and second face 14 of the door 10 may represent, for example, an interior and an exterior side of a door. Such faces may be implemented interchangeably, with door handles 20, 40 being placed on either side of the door 10, such that the door handle or handles with an interior cavity for housing electrical components may be positioned on an interior or an exterior of the door 10.

Referring now to FIGS. 2A-D, an embodiment of a handle 200 is shown. The handle 200 has a handle body 202 with an interior cavity 204. The handle body 202 has an elongated portion that is grippable by a user. In the shown embodiment, the interior cavity 204 has an opening 206 to allow an individual to access the interior cavity 204. In the depicted embodiment, the opening 206 is on a face of the handle body 202 that is positioned on an end of the elongated portion away from an axis of rotation of the handle body 202. The handle 200 also includes an at least semi-translucent cover 210. The cover 210 couples with the handle body 202 to substantially enclose the interior cavity 204.

In the example shown, the handle 200 includes electrical components. The electrical components cooperate to selectively produce light that may illuminate the handle 200 and/or a door to which the handle 200 is mounted. In the depicted embodiment, the electrical components may include a battery 220 positioned within the interior cavity 204. The electrical components may further include, for example, an LED, as well as a light sensor circuit, and a printed circuit board (discussed in further detail below in conjunction with FIGS. 8 and 10). In alternative embodiments, additional electrical components may be included. In examples, the printed circuit board is electrically connected to the other electrical components, and the battery 220 provides power for the components. The light sensor circuit monitors for ambient light.

Figure 2A:
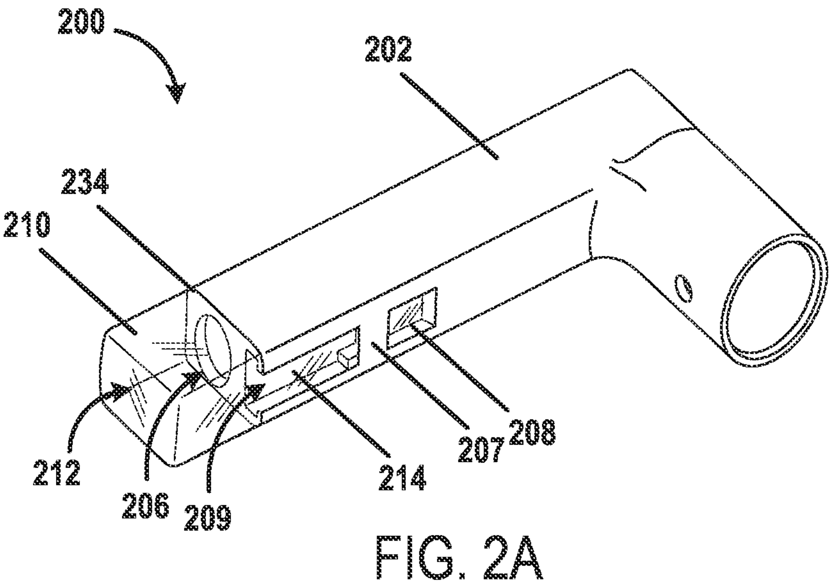
FIG. 2A illustrates a perspective view of a first example embodiment of a handle having an interior cavity.
Figure 2B:
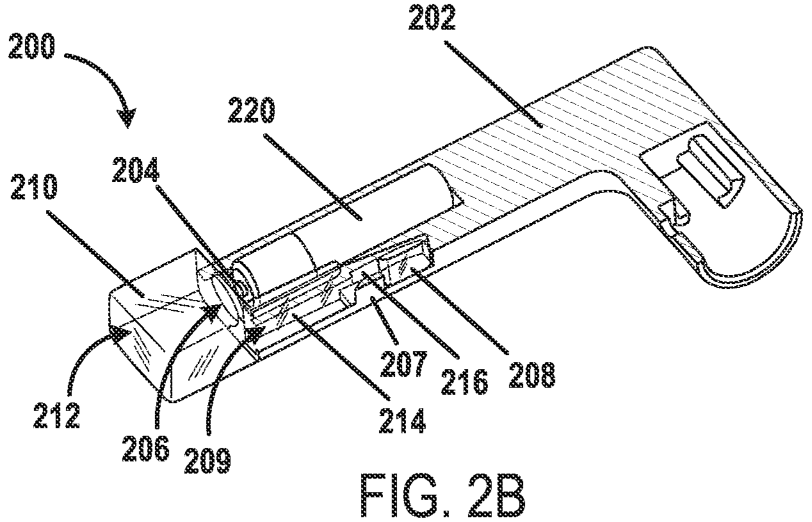
FIG. 2B illustrates a horizontal cross-sectional view of the handle of FIG. 2A.

As shown in FIG. 2B, the battery 220 may be housed in the interior cavity 204 of the handle body 202. The additional electrical components may be positioned within the interior cavity 204 of the handle body 202, or at least partially within a compartment 212 of the semi-translucent cover 210. In particular embodiments, an LED is positioned such that it is oriented toward and may emit light through the semi-translucent cover 210. In further embodiments, each of the electrical components are housed in the interior cavity 204. In embodiments that include supplementary electrical components, these electrical components may be housed in the compartment 212 in the cover 210 and/or in the interior cavity 204 of the handle body 202, or in other locations that allow for similar functionality of the handle 200.

As discussed further below, in operation, when a light sensor circuit detects that the ambient light is below a set threshold, it may activate the LED for at least a period of time, causing the LED to turn on to emit light. This light is emitted through the at least semi-translucent cover 210 and may illuminate the handle 200 and/or the door. In further embodiments, the LED and the cover 210 may be configured such that substantially all of the cover 210 is illuminated by the LED. Additionally, a light filter may be included to change the color of the light projected or to project a pattern.

In the illustrated embodiment, the cover 210 extends out from the elongated portion of the handle body 202. With the LED housed in a compartment 212 in the cover 210, the LED can emit light in multiple directions, including toward the door and away from the door. The cover 210 is removable to allow access to the opening and any electrical components housed in the interior cavity 204. The cover 210 has an appendage 214 with an indentation 216 that slides into a second cavity 209 in the handle body 202 to interact with a bridge 207 across to an opening 208 of the second cavity 209. The appendage 214 is at least partially flexible, allowing it to recess into the second cavity 209 entirely beneath the bridge 207 as is slides along the second cavity 209. Once enough of the appendage 214 slides past the bridge 207 that the indentation 216 on the appendage 214 aligns with the bridge 207, the appendage 214 flexes back to its original orientation, engaging the bridge 207 in the indentation 216. The engagement between the bridge 207 and the indentation 216 removably attaches the cover 210 to the handle body 202. Applying pressure to the appendage 214 (e.g., downward force at the opening 208, and outward force away from the handle body 202 in a direction toward the end of the handle 200) may force it to recess back into the second cavity 209 entirely beneath the bridge 207, allowing the appendage 214 to slide along the length of the second cavity 209 so that the cover 210 may be removed. In alternative embodiments, different constructions of the cover 210 and/or handle body 202 may be used to attach the cover 210 to the handle body 202.

Figure 2C:
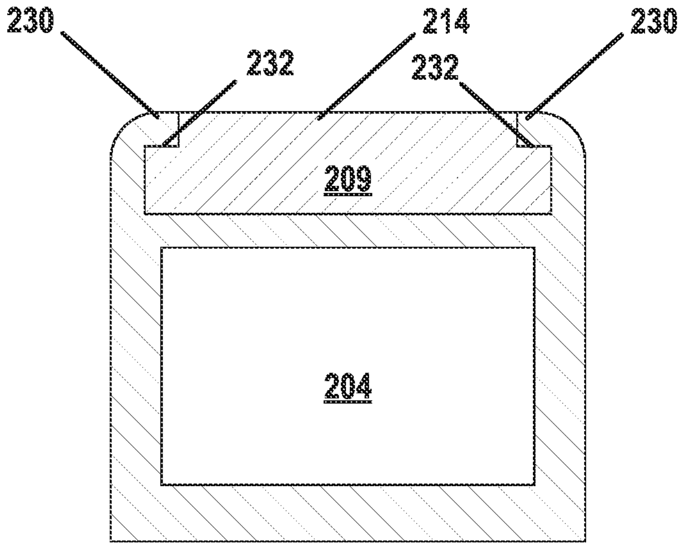
FIG. 2C illustrates a vertical cross-sectional view of the handle of FIG. 2A.

As shown in FIG. 2C, the handle body 202 may partially enclose the opening 208 of the second cavity 209, creating guide rails 230 that interact with recessions 232 along the length of the appendage 214 to form a slot, allowing the appendage 214 to slide into the second cavity 209 from the end of the handle body 202. In alternative embodiments, different configurations of the handle body 202 and/or cover 210 may be used to help guide the attachment of the cover 210 to the handle body 202.

Figure 2D:
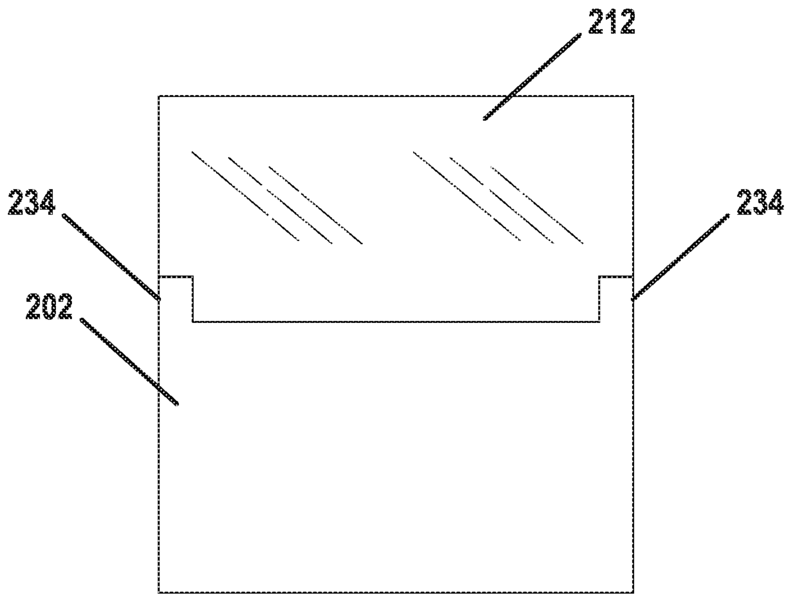
FIG. 2D illustrates a close-up view of an end of the handle of FIG. 2A.

As shown in FIG. 2D, the handle body 202 may include a supportive lip 234 around the perimeter of the end of the handle body 202 that faces the cover 210. The supportive lip 234 at least partially encircles a portion of the cover 210 that makes contact with the handle body 202, to provide support to the cover 210 and substantially prevent misalignment of the cover 210 with the handle body 202. In alternative embodiments, different configurations of the handle body 202 and/or cover 210 may be used to prevent misalignment of the cover 210 with the handle body 202.

Figure 3A:
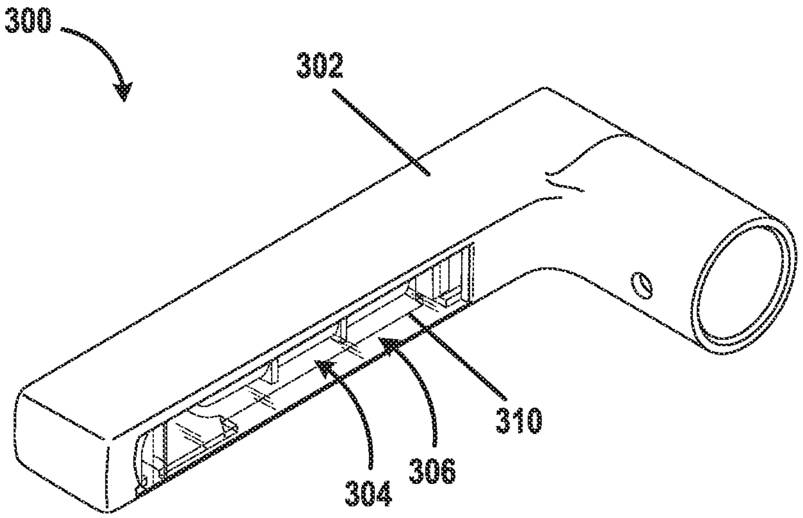
FIG. 3A illustrates a perspective view of a second example embodiment of a handle having an interior cavity.
Figure 3B:
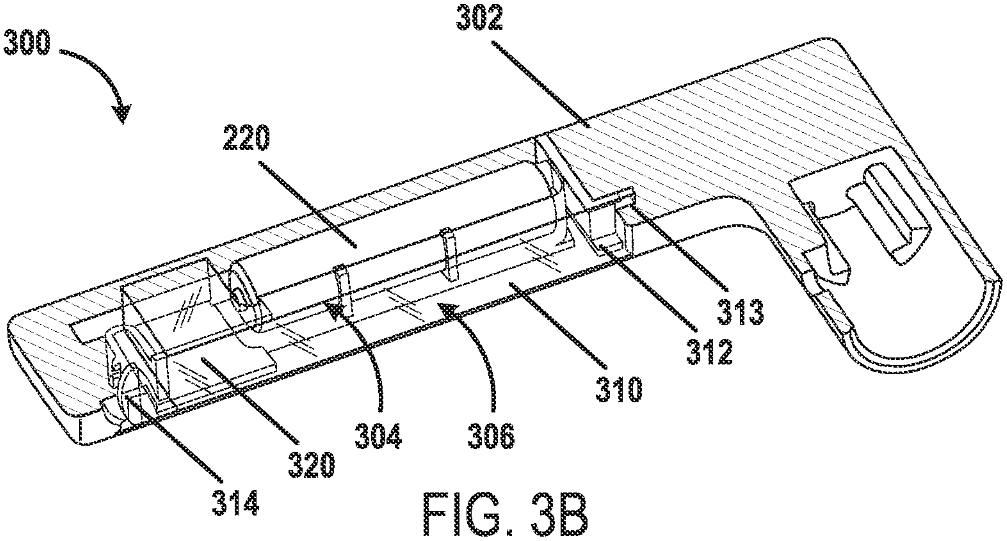
FIG. 3B illustrates a horizontal cross-sectional view of the handle of FIG. 3A.

FIGS. 3A and 3B depict another embodiment of a door handle 300. The embodiment as illustrated has a handle body 302, an interior cavity 304 in the handle body 302, an opening 306 to allow access to the interior cavity 304, an at least semi-translucent cover 310, and electrical components 320. The handle body 302 has an elongated, grippable portion. The electrical components 320 in the shown embodiment can include, for example, a printed circuit board, an LED, a light sensor circuit, and a battery 220 (as discussed below in conjunction with FIGS. 8 and 10). The electrical components 320 in this embodiment function in a manner similar to in the embodiment illustrated in FIGS. 2A-D. In alternative embodiments, additional electrical components may be included.

As shown in FIGS. 3A and 3B, all electrical components 320 included in this embodiment are housed within the interior cavity 304 of the handle body 302. The printed circuit board, light sensor circuit, and LED may, in some instances, be further housed within a compartment in the cover 310, which is itself housed within the interior cavity 304. In alternative embodiments, different arrangements of the electrical components 320 may be used. Additionally, in alternative embodiments, the cover 310 may be configured differently such that it is not entirely positioned inside of the interior cavity 304. In embodiments that include additional electrical components, the additional components may be housed in the interior cavity 304, in the compartment in the cover 310, and/or in any alternative location that allows for similar functionality of the handle 300.

In the illustrated embodiment, the opening 306 to the interior cavity 304 is on a face of the elongated portion of the handle body 302 that faces toward a door (e.g., toward door 10 of FIGS. 1A-1B) to which the handle 300 may be attached. In this embodiment, light emitted from the LED is emitted through the cover 310 and projects onto the door. In alternative embodiments, the LED and the cover 310 may be configured such that substantially all of the cover 310 is illuminated by the LED. Additionally, a light filter may be included to change the color of the light projected or to project a pattern.

The cover 310 is removable from the opening 306 to allow access to the opening 306 and any electrical components 320 housed in the interior cavity 304 of the handle body 302. In this embodiment, best shown in FIG. 3B, the cover 310 has a tab 312 configured to fit within an indentation or slot 313 in a wall of the interior cavity 304 of the handle body 302. The cover 310 also has a partially flexible hook 314 that acts as a release button to remove the cover 310 from the handle body 302. When the cover 310 is attached to the handle body 302, the tab 312 is inserted into the indentation 313 in the wall of the interior cavity 304 and the hook 314 applies pressure against an opposing wall of the interior cavity 304, holding the cover 310 substantially in place. When the hook 314 is flexed away from the second wall, the pressure applied against the second wall decreases, allowing the cover 310 to be maneuvered to pull the tab 312 out of the indentation 313 and remove the cover 310 from the interior cavity 304 (e.g., via a pivoting movement of the end including the hook 314 away from the handle body 302, followed by sliding the tab 312 out of the slot 313).

Figure 4A:
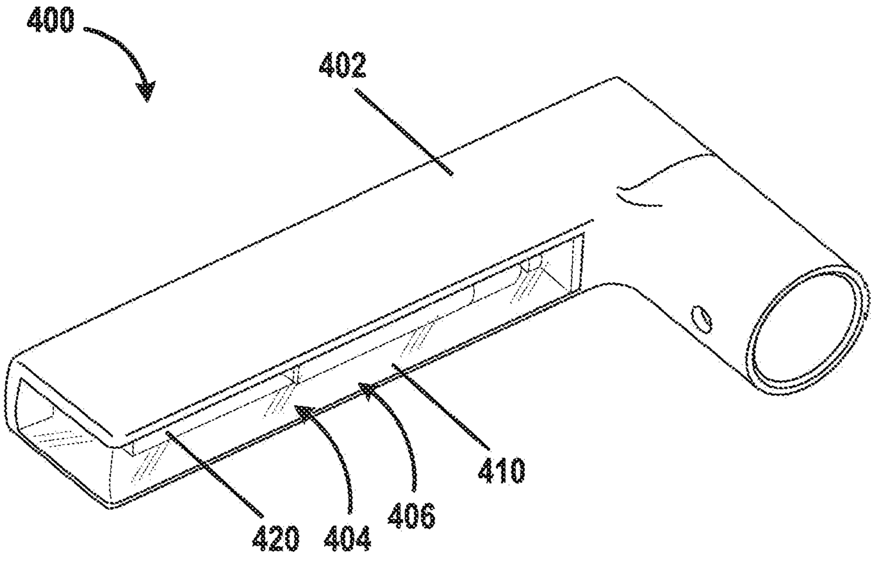
FIG. 4A illustrates a perspective view of a third example embodiment of a handle having an interior cavity.
Figure 4B:
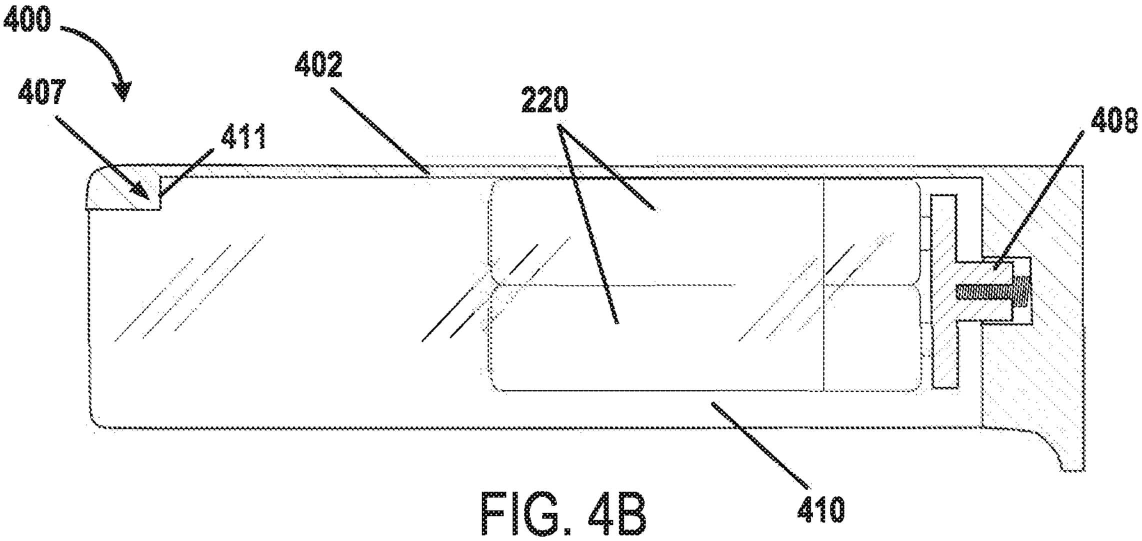
FIG. 4B illustrates a horizontal cross-sectional view of the handle of FIG. 4A.

Turning now to FIGS. 4A and 4B, a further embodiment of a door handle 400 is shown. In this embodiment, the door handle 400 has a handle body 402, an interior cavity 404 in the handle body 402, an opening 406 to allow access to the interior cavity 404, an at least semi-translucent cover 410, and electrical components 420. The handle body 402 has an elongated, grippable portion. The electrical components 420 in the shown embodiment include a printed circuit board, an LED, a light sensor circuit, and one or more batteries 220. In this embodiment, either a single battery may be included, or a second battery may be included based on the available space within the interior cavity 404. The electrical components 420 in this embodiment function in a manner similar to in the embodiment illustrated in FIGS. 2A-D. In alternative embodiments, additional electrical components may be included.

As shown in FIGS. 4A and 4B, all electrical components 420 included in this embodiment are housed within the interior cavity 404 of the handle body 402. The printed circuit board, light sensor circuit, and LED may be further housed within a compartment in the cover 410, which is itself housed within the interior cavity 404. In alternative embodiments, different arrangements of the electrical components 420 may be used. Additionally, in alternative embodiments, the cover 410 may be configured differently such that it is not entirely positioned inside of the interior cavity 404. In embodiments that include additional electrical components, the additional components may be housed in the interior cavity 404, in the compartment in the cover 410, and/or in any alternative location that allows for similar functionality of the handle 400.

In the illustrated embodiment, the opening 406 to the interior cavity 404 is on multiple faces of the elongated portion of the handle body 402. The opening 406 to the interior cavity 404 may be on a face of the handle body 402 that faces toward a door (e.g., door 10) to which the handle 400 is attached and on a face on the end of the elongated portion of the handle body 402 away from the axis of rotation of the handle body 402. In this embodiment, light emitted from the LED shines through the cover 410 and can project onto the door. Light emitted from the LED can also shine through the cover 410 and out of the opening 406 on the face on the end of the elongated portion away from the axis of rotation of the handle body 402. In alternative embodiments, the LED and the cover 410 may be configured such that substantially all of the cover 410 is illuminated by the LED. Additionally, a light filter may be included to change the color of the light projected or to project a pattern.

The cover 410 can be removed to allow access to the opening 406 and any electrical components 420 housed in the interior cavity 404 of the handle body 402. In this embodiment, best shown in FIG. 4B, the interior cavity 404 has a retaining clip 407 on a first wall of the cavity 404 and a spring assembly 408 on a second wall of the cavity 404. The cover 410 has a notch 411 that is configured to engage with the retaining clip 407 of the cavity 404. When the cover 410 is attached to the handle body 402 in the interior cavity 404, the spring assembly 408 applies pressure against the cover 410 and forces engagement between the notch 411 in the cover 410 and the retaining clip 407 on the first wall of the cavity 404. By applying pressure against the cover 410 in a direction at least partially against the direction of the pressure applied by the spring assembly 408 on the cover 410, the spring assembly 408 can be compressed, and the notch 411 in the cover 410 can be separated from the retaining clip 407 of the cavity 404, allowing the cover 410 to be maneuvered out of the interior cavity 404 and removed from the handle body 402.

Figure 5A:
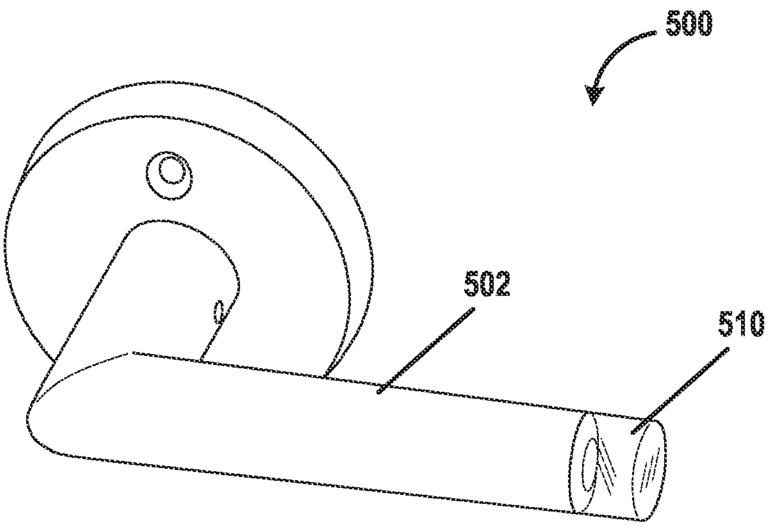
FIG. 5A illustrates a perspective view of a fourth example embodiment of a handle having an interior cavity.
Figure 5B:
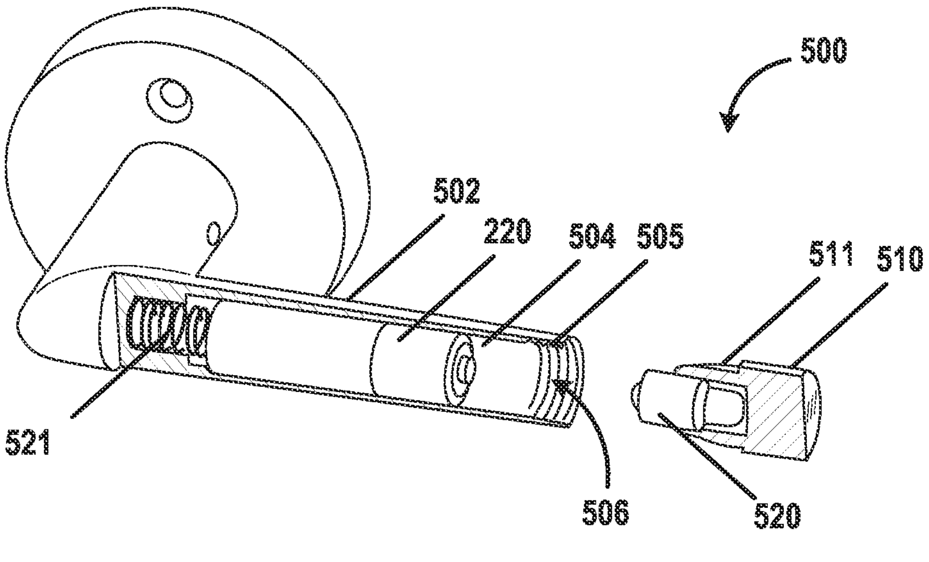
FIG. 5B illustrates a vertical cross-sectional view of the handle of FIG. 5A.

Referring now to FIGS. 5A and 5B, another embodiment of a door handle 500 is shown. In this embodiment, the door handle 500 includes a handle body 502, an interior cavity 504 in the handle body 502, an opening 506 to allow access to the interior cavity 504, an at least semi-translucent cover 510, and electrical components 520. The handle body 502 has an elongated, grippable portion. In the depicted embodiment, the opening 506 is on a face of the handle body 502 at the end of the elongated portion away from the axis of rotation of the handle body 502. The electrical components 520 in the shown embodiment include a printed circuit board, an LED, a light sensor circuit, and a battery 220. The electrical components 520 in this embodiment function in a manner similar to in the embodiment illustrated in FIGS. 2A-D. In alternative embodiments, additional electrical components may be included.

As shown in FIGS. 5A and 5B, all electrical components included in this embodiment are housed within the interior cavity 504 of the handle body 502. Electrical components 520, for example including printed circuit board, light sensor circuit, and LED, are further housed within a compartment in a cover 510, the compartment being housed, at least in part, in the interior cavity 504. A battery 220 is positioned within the interior cavity 504, and may be electrically connected to the electrical components 520 for power delivery. In alternative embodiments, different arrangements of the electrical components 520 may be used. In embodiments that include additional electrical components, the additional components may be housed in the interior cavity 504, in the compartment in the cover 510, and/or in any alternative location that allows for similar functionality of the handle 500.

In the illustrated embodiment, the cover 510 extends out from the elongated portion of the handle body 502. With the LED housed in a compartment in the cover 510, the LED can emit light in multiple directions, including toward the door and/or away from the door. In alternative embodiments, the LED and the cover 510 may be configured such that substantially all of the cover 510 is illuminated by the LED. Additionally, a light filter may be included to change the color of the light projected or to project a pattern.

The cover 510 can be removed to allow access to the opening 506 and any electrical components 520 housed in the interior cavity 504 of the handle body 502. In this embodiment, best shown in FIG. 5B, the opening 506 to the interior cavity 504 and the cover 510 are threaded, with the opening 506 including interior threads 505 and the cover 510 having outer threads 511, respectively, such that the cover 510 can be attached by screwing the threads 505 of the opening 506 and the threads 511 of the cover 510 together. The cover 510 can be removed by unscrewing the threads 505, 511 of the opening 506 and the cover 510. In alternative embodiments, different means of attaching the cover 510 to the handle body 502 may be used.

The screwing of the cover 510 to the handle body 502 can also be used to act as a switch that controls the operability of the electrical components 520 of the door handle 500. By screwing the cover 510 to a position such that the threads 511 of the cover 510 and the threads 505 of the opening 506 are engaged to attach the cover 510 to the handle body 502 without having the cover 510 screwed in entirely, the electrical connection between the battery 220 in the interior cavity 504 and the electrical components 520 in the compartment of the cover 510 may be disconnected, stopping operation of the electrical components 520 of the door handle 500. Additionally, different rotational positions of the cover 510 relative to the handle body 502 may initiate different functionality (e.g., controlling a color of light emitted, controlling an amount of time an LED remains active, and the like). In the example shown, a spring 521 biases the battery 220 toward the electrical components 520 to maintain electrical connection when the cover 510 is in place at the end of the handle body 502.

Figure 6A:
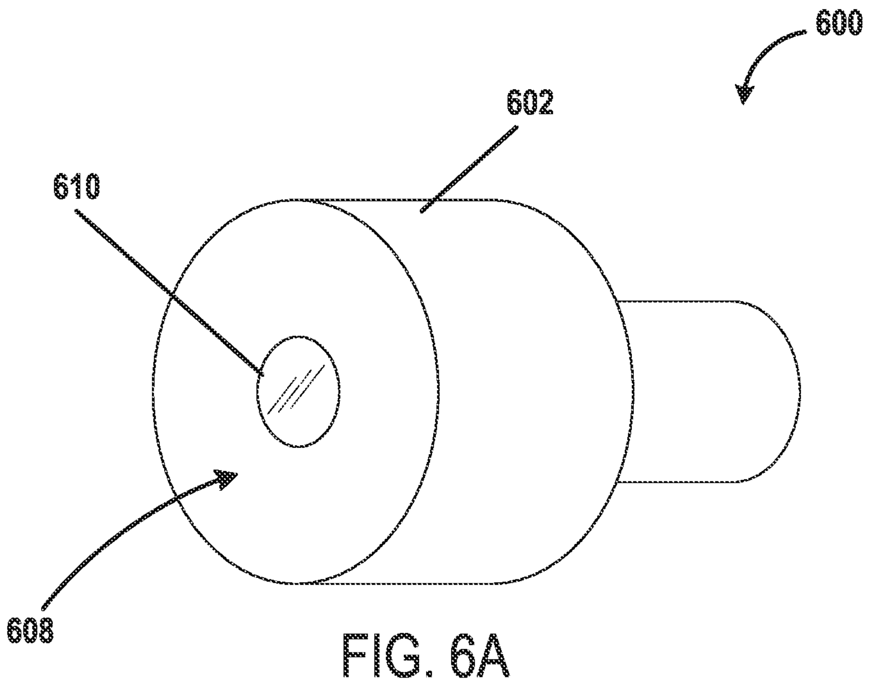
FIG. 6A illustrates a perspective view of a fifth example embodiment of a handle having an interior cavity.
Figure 6B:
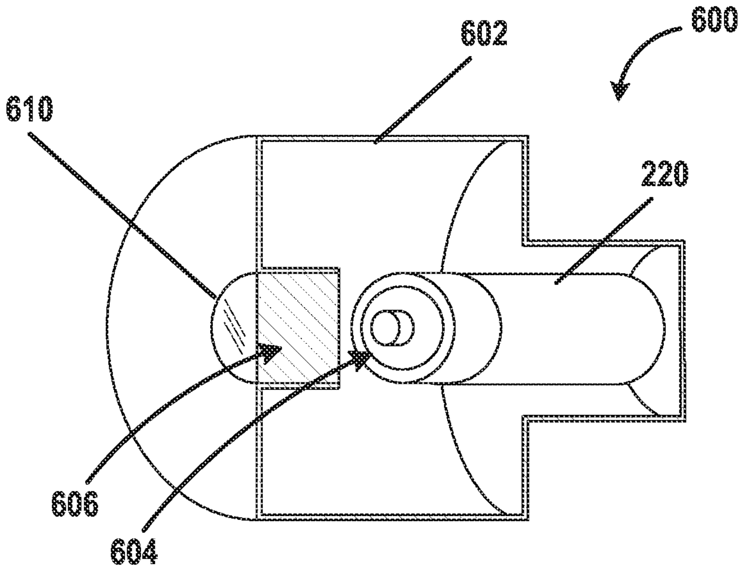
FIG. 6B illustrates a vertical cross-sectional view of the handle of FIG. 6A.

FIGS. 6A and 6B illustrate an additional embodiment of a door handle 600. This embodiment has a handle body 602, an interior cavity 604 in the handle body 602, an opening 606 to allow access to the interior cavity 604, an at least semi-translucent cover 610, and electrical components. The electrical components in the shown embodiment include a printed circuit board, an LED, a light sensor circuit, and battery 220. The electrical components in this embodiment function in a manner similar to in the embodiment illustrated in FIGS. 2A-D. In alternative embodiments, additional electrical components may be included.

The handle body 602 in the depicted embodiment is generally cylindrical, with the faces of the handle body 602 being substantially parallel to a face of a door. In alternative embodiments, the handle body 602 can be at least moderately spherical or ellipsoidal with a significantly flat face configured to face away from the door when the handle 600 is installed on the door.

As shown in FIGS. 6B, all electrical components included in this embodiment are housed within the interior cavity 604 of the handle body. The printed circuit board, light sensor circuit, and LED are further housed within a compartment in the cover 610, the compartment being housed in the interior cavity 604. In alternative embodiments, different arrangements of the electrical components may be used. In embodiments that include additional electrical components, the additional components may be housed in the interior cavity 604, in the compartment in the cover 610, and/or in any alternative location that allows for similar functionality of the handle 600.

In the illustrated embodiment, the opening 606 to the interior cavity 604 is on a face 608 of the handle body 602 facing away from a door at which the handle 600 is mounted. In this embodiment, light emitted from the LED shines through the cover 610 and can project away from the door. In alternative embodiments, the LED and the cover 610 may be configured such that substantially all of the cover 610 is illuminated by the LED. Additionally, a light filter may be included to change the color of the light projected or to project a pattern. In further alternative embodiments, the cover 610 and the opening 606 can be configured to span smaller or greater proportions of the face 608 of the handle body 602 facing away from the door.

In embodiments, the cover 610 may be removed in a manner similar to the manner of removal for the covers described in FIGS. 2-5 to allow access to the electrical components housed in the interior cavity 604. In an embodiment, the opening 606 to the interior cavity 604 and the cover 610 are threaded (not shown) such that the cover 610 can be attached by screwing the threads of the opening 606 and the cover 610 together, and the cover 610 can be removed by unscrewing the threads of the opening 606 and the cover 610. In alternative embodiments, different means of attaching the cover 610 to the handle body 602 may be used.

As with the handle 500 of FIG. 5, screwing of the cover 610 to the handle body 602 can also be used to act as a switch that controls the operability of the electrical components of the door handle 600. By screwing the cover 610 to a position such that the threads of the cover 610 and the threads of the opening 606 are engaged to attach the cover 610 to the handle body 602 without having the cover 610 screwed in entirely, the electrical connection between the battery 220 in the interior cavity 604 and the electrical components in the compartment of the cover 610 may be disconnected, stopping operation of the electrical components of the door handle 600. Additionally, different rotational positions of the cover 610 relative to the handle body 602 may initiate different functionality (e.g., controlling a color of light emitted, controlling an amount of time an LED remains active, and the like).

Figure 7A:
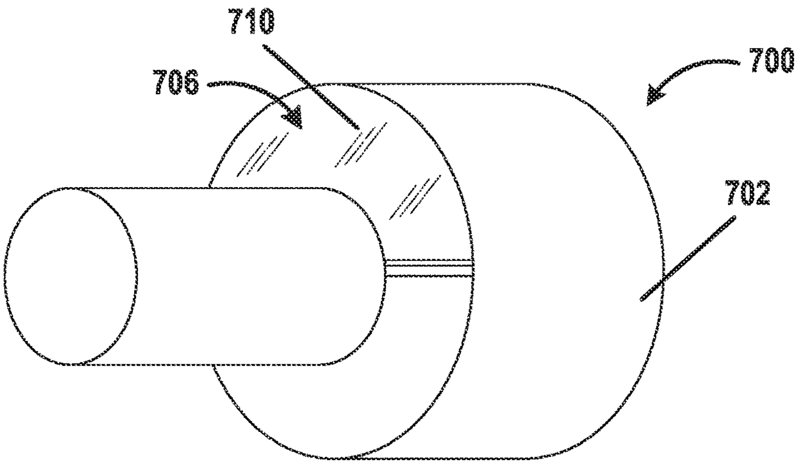
FIG. 7A illustrates a perspective view of a sixth example embodiment of a handle having an interior cavity.
Figure 7B:
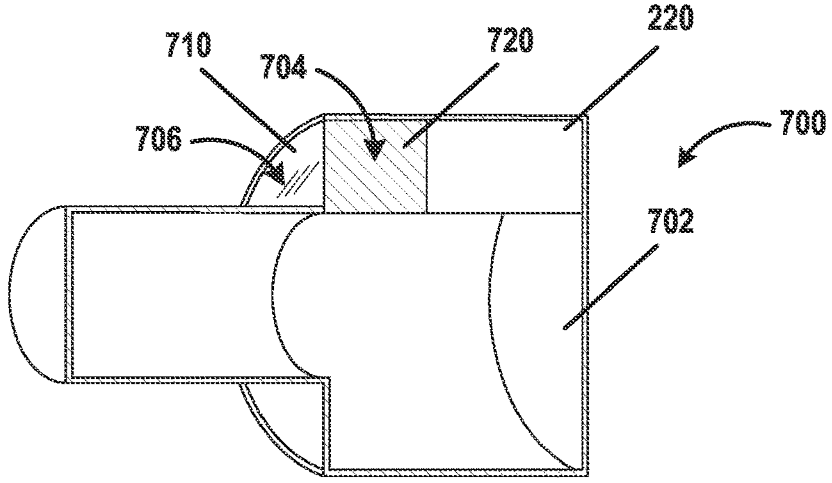
FIG. 7B illustrates a vertical cross-sectional view of the handle of FIG. 7A.
Figure 7C:
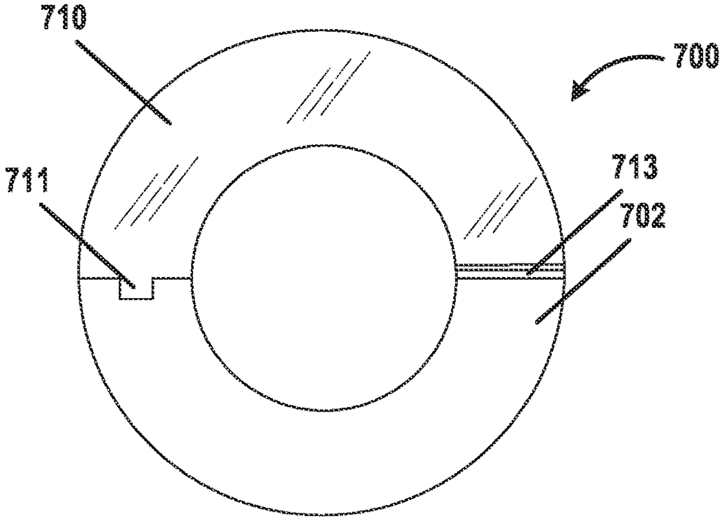
FIG. 7C illustrates a view of the handle of FIG. 7A from the back.

Turning now to FIGS. 7A-C, a further embodiment of a door handle 700 is shown. In this example embodiment, the door handle 700 has a handle body 702, an interior cavity 704 in the handle body 702, an opening 706 to allow access to the interior cavity 704, an at least semi-translucent cover 710, and electrical components 720. The electrical components 720 in the shown embodiment can include a printed circuit board, an LED, a light sensor circuit, and a battery. The electrical components 720 in this embodiment function in a manner similar to in the embodiment illustrated in FIGS. 2A-D. In alternative embodiments, additional electrical components may be included.

The handle body 702 in the depicted embodiment is at least moderately cylindrical, with the faces of the handle body 702 being substantially parallel to a face of a door. In alternative embodiments, the handle body 702 can be at least moderately spherical or ellipsoidal with a significantly flat face configured to face away from the door when the handle 700 is installed on the door.

As shown in FIG. 7B, all electrical components 720 included in this embodiment are housed within the interior cavity 704 of the handle body 702. The printed circuit board, light sensor circuit, and LED are further housed within a compartment in the cover 710, the compartment being housed in the interior cavity 704. In alternative embodiments, different arrangements of the electrical components 720 may be used. In embodiments that include additional electrical components, the additional components may be housed in the interior cavity 704, in the compartment in the cover 710, and/or in any alternative location that allows for similar functionality of the handle 700.

In the illustrated embodiment, the opening 706 to the interior cavity 704 is on the face of the handle body 702 facing toward the door. In this embodiment, light emitted from the LED shines through the cover 710 and can project onto the door. In alternative embodiments, the LED and the cover 710 may be configured such that substantially all of the cover 710 is illuminated by the LED. Additionally, a light filter may be included to change the color of the light projected or to project a pattern. In further alternative embodiments, the cover 710 and the opening 706 can be configured to span smaller or greater proportions of the face of the handle body 702 facing toward the door.

In embodiments, the cover 710 may be removed in a manner similar to the manner of removal for the covers described in FIGS. 2-5 to allow access to the electrical components 720 housed in the interior cavity 704. In an embodiment, best shown in FIG. 7C, the cover 710 forms an arc across the face of the handle body 702 facing toward the door. The cover 710 has a tab 711 at one end of the arc configured to fit within an indentation in a first wall of the interior cavity 704 of the handle body 702. The cover 710 also has a partially flexible hook 713 on the other end of the arc that acts as a release button to remove the cover 710 from the handle body 702. When the cover 710 is attached to the handle body 702, the tab 711 is inserted into the indentation in the first wall of the interior cavity 704 and the hook 713 applies pressure against a second wall of the interior cavity 704, holding the cover 710 substantially in place. When the hook 713 is flexed away from the second wall, the pressure applied against the second wall decreases, allowing the cover 710 to be maneuvered to pull the tab 711 out of the indentation and remove the cover 710 from the interior cavity 704.

Figure 8:
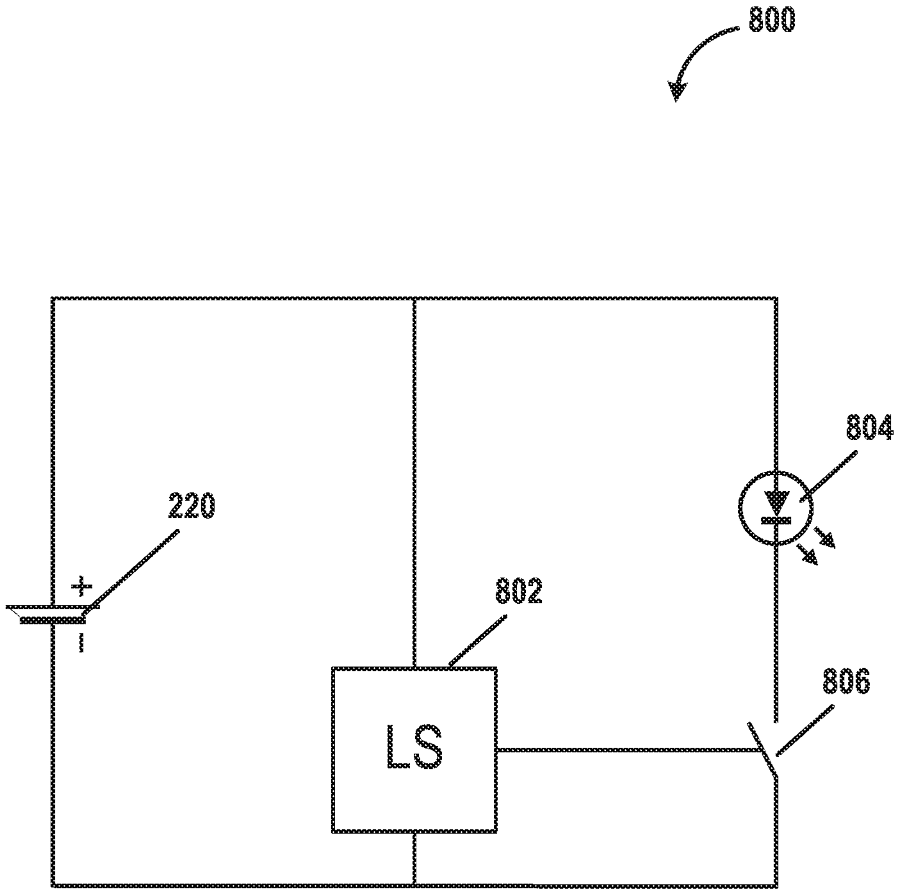
FIG. 8 illustrates a circuit diagram of an example embodiment of a printed circuit board used in a handle.

FIG. 8 depicts a schematic illustration of an embodiment of the printed circuit board 800 and the connections between the electrical components used in the door handle embodiments depicted in FIGS. 2-7. In the depicted embodiment, a battery 220 supplies voltage to the circuit 800. In an embodiment, the battery 220 is an alkaline battery. In additional embodiments, the battery 220 can be a lead-acid battery, a nickel-cadmium battery, a nickel-metal hybrid battery, a lithium-ion battery, a zinc carbon battery, a coin cell battery, a zinc-air battery, or a rechargeable battery. In further embodiments, multiple batteries can be used, of the same or different type.

A light sensor circuit 802 controls a control element that opens and closes a connection to an LED 804. In an embodiment, the light sensor circuit 802 includes a photoresistor and the control element is a transistor 806. When photons of light hit the base of the photoresistor, the photoresistor produces an electrical signal. This signal causes the transistor 806 to trigger, closing the connection between the battery 220 and the LED 804, causing the LED 804 to emit light. In alternative embodiments, the light sensor circuit 802 and the control element can include additional or alternative elements that allow for similar function of the circuit 800 as a whole.

In embodiments of a door handle that include additional electrical components, the additional electrical components can be integrated into the circuit 800 depicted in FIG. 8.

Figure 9A:
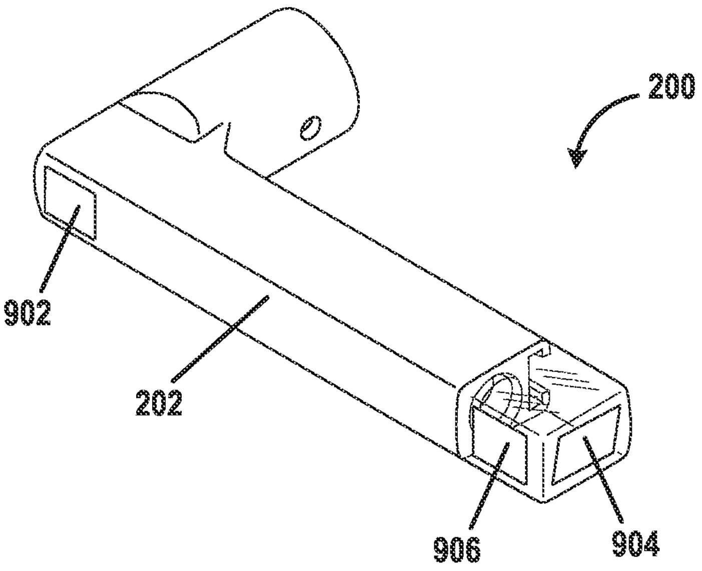
FIG. 9A illustrates an example embodiment of a handle with an interior cavity with three possible locations for placement of a motion sensor.
Figure 9B:
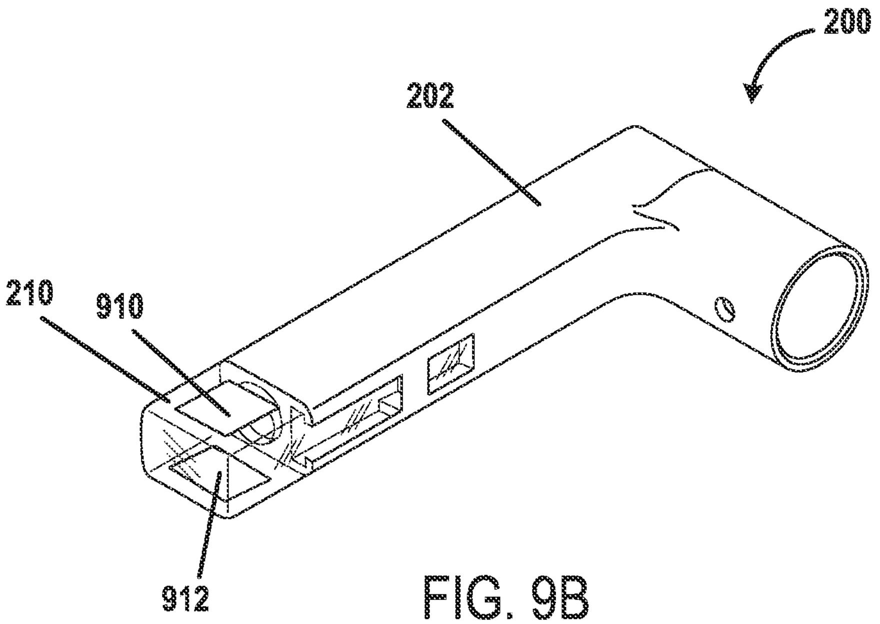
FIG. 9B illustrates the handle of FIG. 9A cavity with two different possible locations for placement of a motion sensor.

Referring now to FIGS. 9A and 9B, embodiments of a door handle 900 with an additional electrical component—a motion sensor—are shown. The motion sensor allows for further control of when the LED emits light when the LED is in the active state. The motion sensor can be configured to monitor for a user approaching the door handle. In response to sensing a user approaching the door handle 200, the motion sensor can send a signal that causes the LED to emit light if the LED is in the active state. In embodiments, the motion sensor is housed in a compartment in the at least semi-translucent cover 210. In alternative embodiments, the motion sensor is housed in the interior cavity of the handle body 202. In embodiments in which the motion sensor is housed in the interior cavity, the interior cavity may have a second opening through which the motion sensor faces.

In particular, FIGS. 9A-9B show various positions of a motion sensor within the context of the handle 200 of FIGS. 2A-2B, with like numerals referring to like elements of that handle 200. However, a motion sensor may be integrated into any of the variety of embodiments of handles as described herein.

In the particular examples shown, FIG. 9A shows three possible locations for a motion sensor to integrated into a door handle. A first position 902 faces the motion sensor out from a surface of the at least semi-translucent cover 210 away from the door. A second position 904 faces the motion sensor out from the cover 210 in the direction that an elongated portion of the handle body 202 extends. A third position 906 faces the motion sensor out of a second opening of the interior cavity and away from the door. Placing a motion sensor at one of the three possible locations identified in FIG. 9A allows the door handle 200 to be installed as either a right-handed handle or a left-handed handle without substantially changing the range monitored by the motion sensor.

FIG. 9B shows two additional possible locations for such a motion sensor. In the example shown, a fourth position 910 faces the motion sensor up from the cover 210. A fifth position 912 faces the motion sensor down from the cover 210.

In an embodiment, a motion sensor is placed at just one of these possible locations 902-912. In alternative embodiments, the door handle includes multiple motion sensors which can be placed at a combination of the possible locations. In further embodiments, a motion sensor may be placed in a position not described above that allows for similar functionality.

Figure 10:
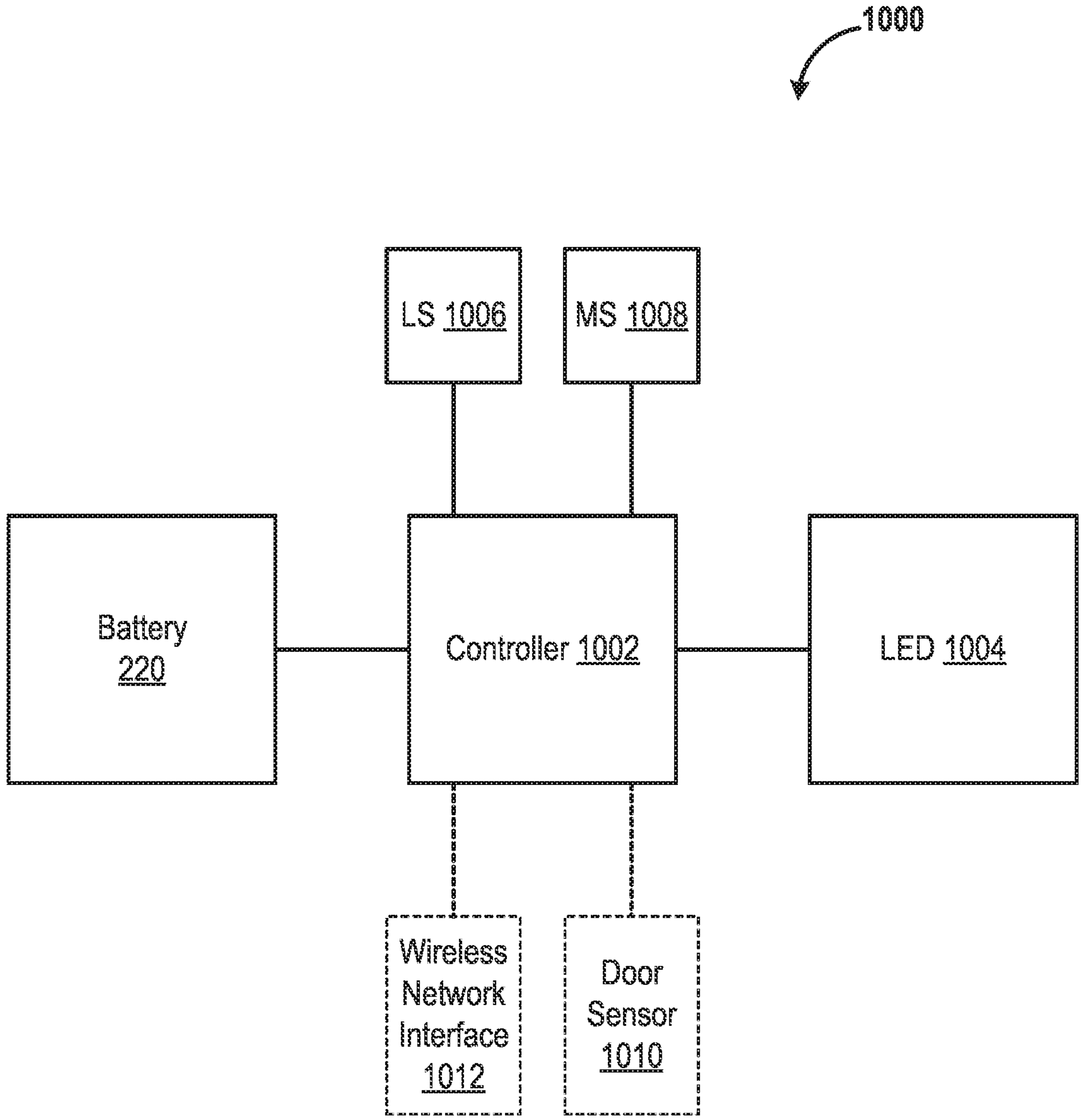
FIG. 10 illustrates a block diagram of an embodiment of a handle.

FIG. 10 depicts a block diagram 1000 of the electrical components in embodiments that include additional electrical components. In the embodiment shown, electrical components of a door handle can include a battery 220, a controller 1002, a light sensor circuit 1006, an LED 1004, and a motion sensor 1008. A door handle, as may be implemented in accordance with any of the above embodiments, may also include a door sensor 1010 that may sense whether a door to which the door handle is attached is opened or closed. The door handle may further include a wireless network interface 1012 for additional functionality as explained below.

In the depicted embodiment, the battery 220 provides power for the other electrical components. The controller 1002 controls the LED 1004 based on signals it receives from the other electrical components, including the light sensor circuit 1006, the motion sensor 1008, and a possible door sensor 1010. A signal from the light sensor circuit 1006 may cause the controller 1002 to transition the LED 1004 between an active state and an inactive state. The active state corresponds to a timing at which the controller 1002 may cause the LED 1004 to turn on to emit light. Additionally, a signal from the light sensor 1006 indicating high or low levels of ambient light may cause the controller 1002 to change the brightness of the LED 1004. The controller 1002 may turn the LED 1004 on in response to a signal from the motion sensor 1008 indicating that a user is approaching the door handle. The controller 1002 may leave the LED 1004 on for as long as the motion sensor 1008 detects movement in a detection zone. Alternatively, the controller 1002 may leave the LED 1004 on for a preset amount of time after motion is detected. A signal from the door sensor 1010 indicating that the door is open may cause the controller to not turn on the LED 1004, even if other signals from other electrical components send signals that would normally cause the controller 1002 to turn on the LED.

Additionally, the controller 1002 may control the LED 1004 based on configured settings stored in the controller 1002. These settings may be received or changed through the wireless network interface 1012 or through a switch on the handle. These settings may cause the controller 1002 to adjust various characteristics of the light emitted by the LED 1004, including the color of the light, the intensity of the light, and the temperature of the light. The settings may also cause the controller 1002 to control the length of time that the LED 1004 emits light while the LED 1004 is in the active state. For example, the controller 1002 may include a timer that causes the LED 1004 to be on for a set amount of time while in the active state. A timer could also be used to cause the controller to turn the LED 1004 on at a certain time of day. The time of day at which the LED 1004 is turned on could be updated based on the time of year, with the LED 1004 being turned on at an earlier time of day when sunset is earlier in the day.

The controller 1002 may also control the LED 1004 based on various other conditions. For example, the controller 1002 may change color of the light emitted by the LED 1004 or may cause the LED 1004 to blink to indicate that a room is occupied or available. The controller 1002 may also cause the LED 1004 to change color or blink to indicate that the battery in the door handle is below a threshold amount of charge remaining.

Figure 11:
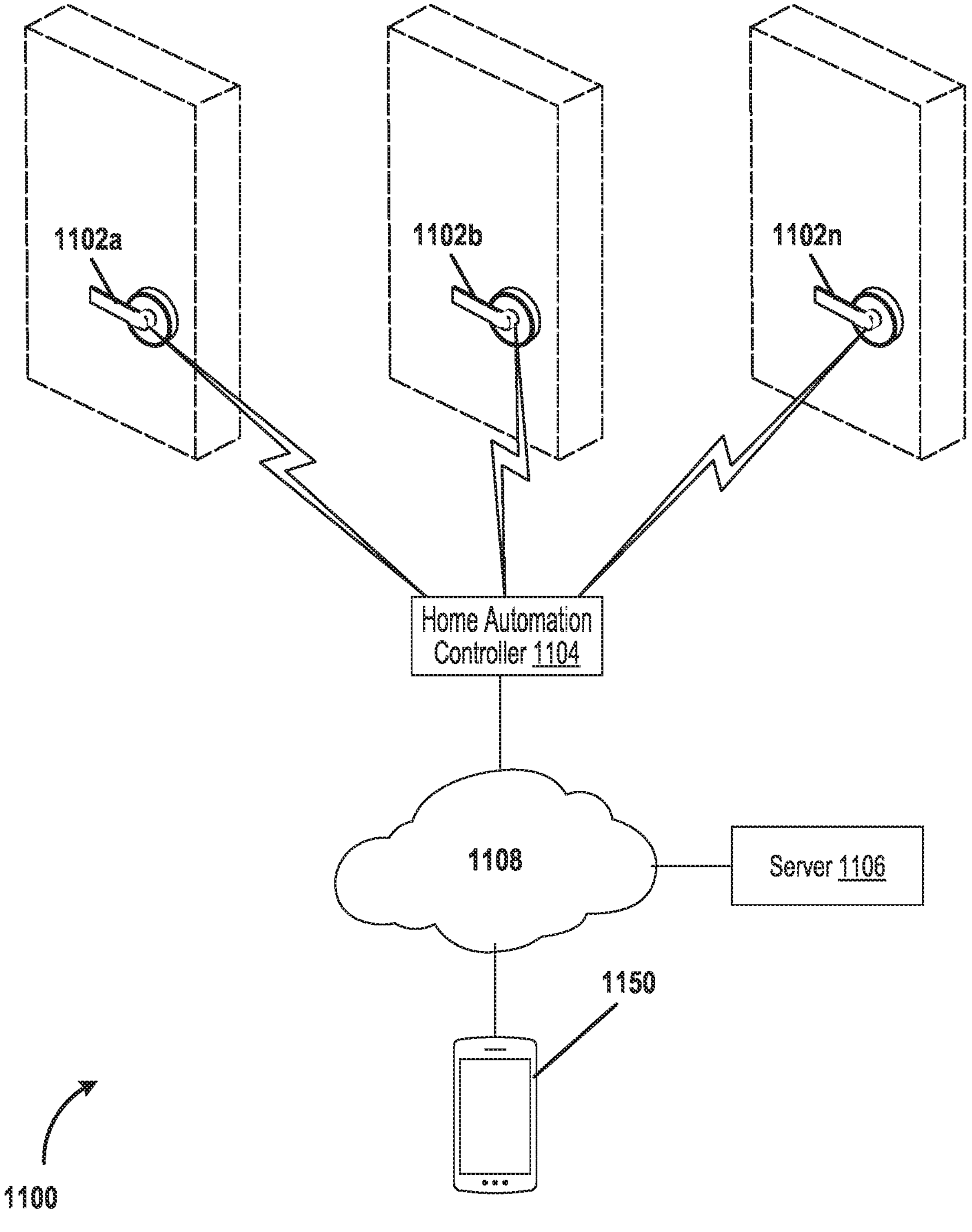
FIG. 11 illustrates a schematic of the wireless connections of a system including embodiments of a handle, a home automation controller, a remote server, and a mobile device.

FIG. 11 depicts a networked system 1100 that provides wireless communicative connections among a series of door handles 1102*a-n*, each having wireless network interfaces, an optional home automation controller 1104, a remote server 1106, and a mobile device 1150. The wireless network interfaces in the door handles (e.g., as discussed above with respect to FIG. 10) may communicate with the home automation controller 1104 through a low power wireless protocol. The low power wireless protocol could be the IEEE 802.15.4 standard (Zigbee® and Z-Wave®), the IEEE 802.15.1 standard (Bluetooth®), or another low power mesh networking standard. The home automation controller may communicate with the remote server 1106 via a Wi-Fi interface, through a network 1108, such as the internet. The remote server 1106, and home automation controller 1104, may communicate with the mobile device 1150 using a Wi-Fi interface, a cellular network, or another wireless connection. Alternatively, the home automation controller 1104 may be in direct communication with the mobile device 1150 via a Wi-Fi interface or another wireless interface.

The mobile device 1150 may display a graphical user interface through which a user may change a variety of settings for a door handle 1102*a-n*. The settings may apply to an individual door handle or multiple door handles associated with the user. These settings may change characteristics of the LED, including the duration of light emitted, the color of the light emitted, the intensity of the light emitted, and the temperature of the light emitted. The settings may also change the length of time that the LED emits light, either as a set length of time or by setting a time of day during which the LED is on. The settings may further turn the entire door handle system off, or they may turn off individual sensors included in the system. As the user changes settings in the graphical user interface, the mobile device 1150 sends the updated settings to the home automation controller 1104, either directly or through a user account associated with the door handles 1102*a-n* at remote server 1106. The home automation controller 1104 then pushes the updated settings to any door handle 1102*a-n* that had its settings changed.

Figure 12:
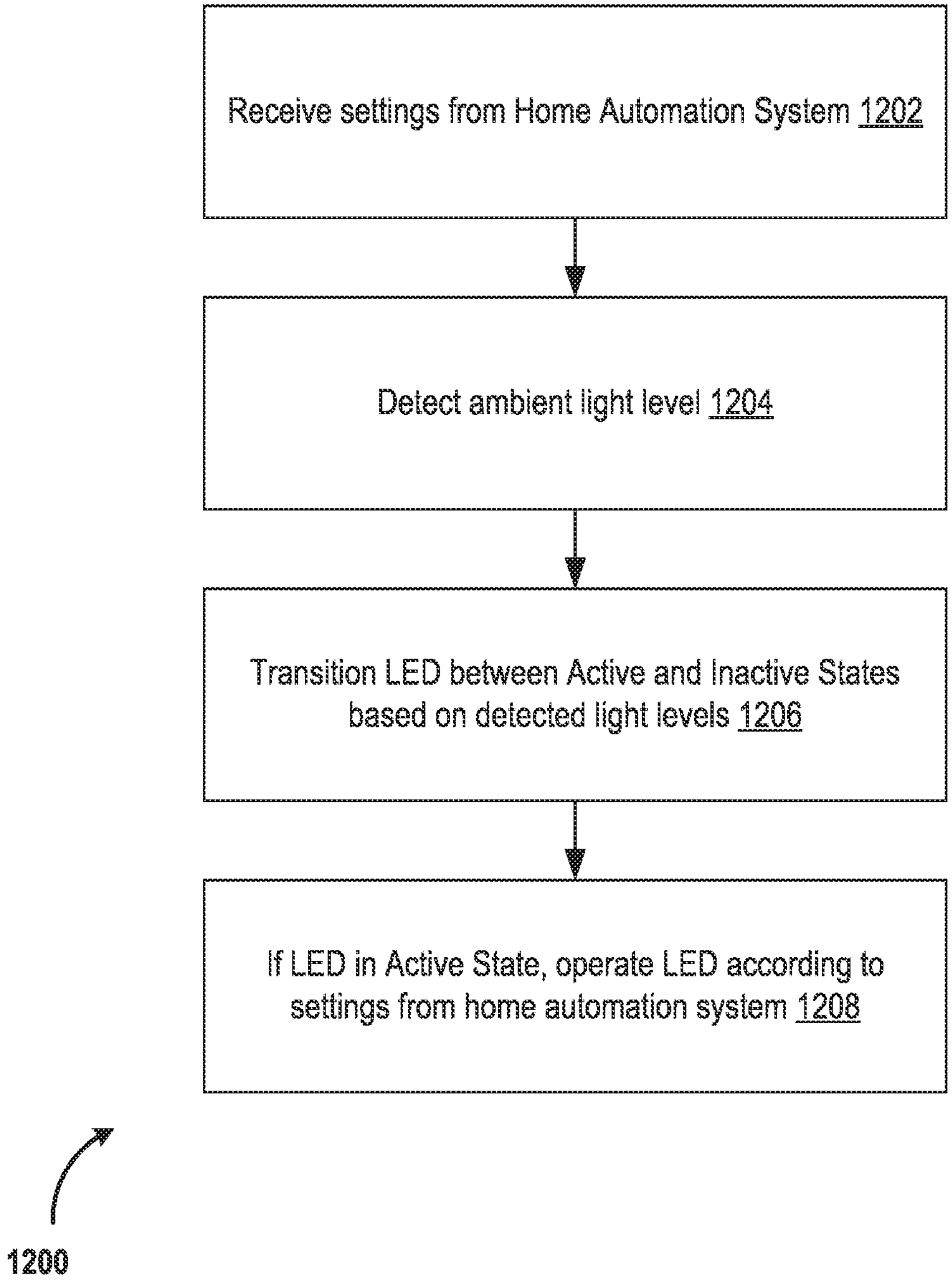
FIG. 12 illustrates a flow chart of a method of operation of an embodiment of a handle.

Referring now to FIG. 12, a flowchart describing a method 1200 of operation for a door handle is shown, according to an example embodiment. The method 1200 may be performed using any of the door handles described herein.

In the example shown, the method 1200 includes the door handle receiving settings from a home automation system (step 1202). The door handle may be in communication with the home automation system via Bluetooth, Zigbee, Z-wave, or another low power wireless communication protocol. The settings received from the home automation system may be settings configured by a user, or they may be default settings. These settings may change characteristics of the LED, including the color of the light emitted, the intensity of the light emitted, and the temperature of the light emitted. The settings may also change the length of time that the LED emits light while the LED is in an active state, either as a set length of time or by setting a time of day during which the LED is on if the LED is in an active state. The settings may further turn the entire door handle system off, or they may turn off individual sensors included in the system.

In the example shown, the method 1200 includes a light sensor circuit in the door handle detecting ambient light levels (step 1204). The ambient light levels may be assessed relative to a particular threshold. Based on the determined light level, an LED of the door handle is selectively illuminated, based at least in part on the amount of ambient light detected (step 1206). If the amount of ambient light detected is below a threshold, the LED is put into the active state. If the amount of ambient light is above the threshold, the LED is put into the inactive state. The LED is operated according to the settings received from the home automation system (step 1208). That is, a controller at the door handle may determine to, based on particular settings, illuminate an LED for the entire period in which a particular light level is detected, or for only a portion of that time.

In some examples of the method 1200 certain steps may be excluded. For example, a controller may be preprogrammed with particular settings, and may not include a wireless communication interface. In such embodiments, no receipt of updated settings from a home automation system may occur. Rather, the preprogrammed settings may be used to assess times during which the LED is to be illuminated. Other configurations are possible as well.

Figure 13A:
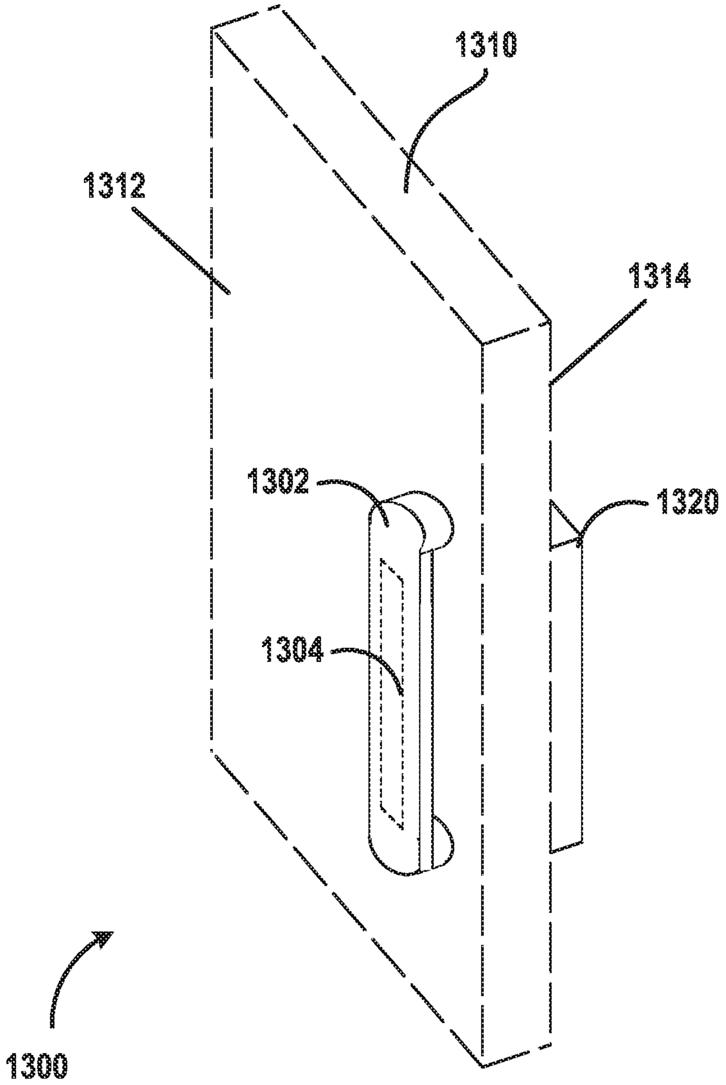
FIG. 13A illustrates a perspective view of an exterior side of a front panel of a cabinet/drawer having a handle mounted on the exterior side and a power source mounted on an interior side of the front panel.
Figure 13B:
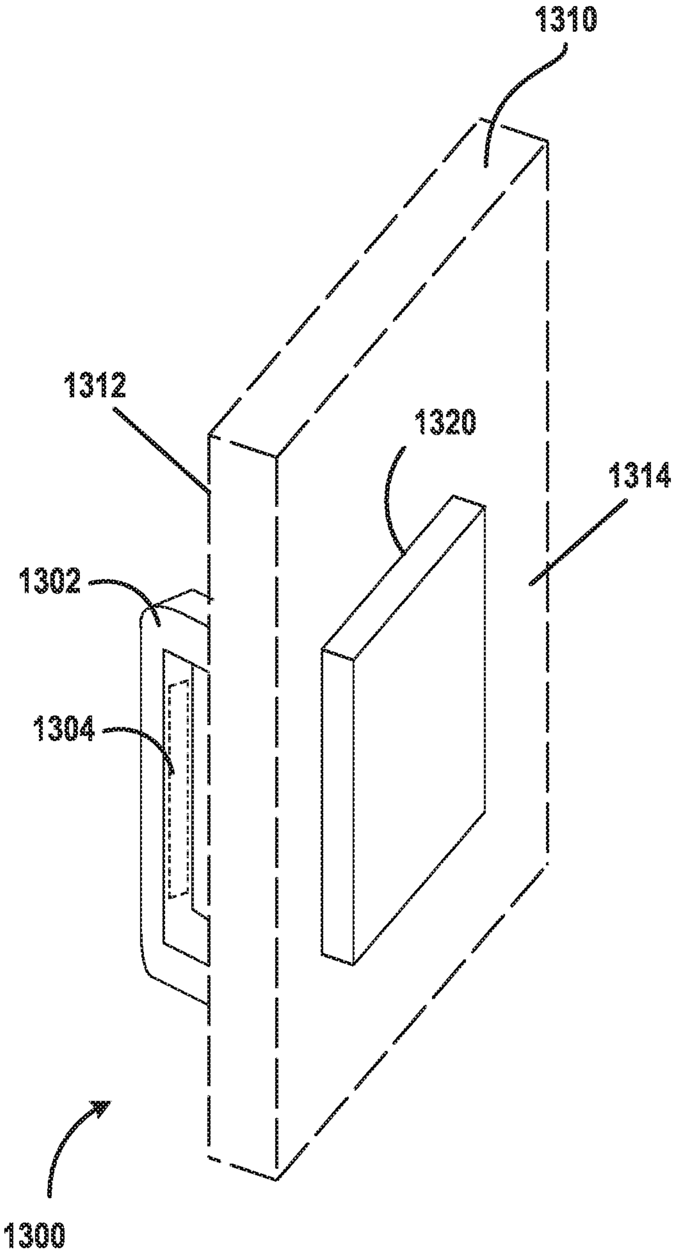
FIG. 13B illustrates a perspective view of the interior side of the front panel of FIG. 13A.

Turning now to FIGS. 13A and 13B, an embodiment of a handle 1300 for a cabinet or drawer is illustrated. The handle 1300 has a handle body 1302 that is mounted on the exterior side 1312 of a front panel 1310 of the cabinet/drawer. The handle 1300 also has a power source 1320 mounted to an interior side 1314 of the front panel 1310. The handle body may have an interior cavity 1304. The interior cavity 1304 may be used to house electrical components. Non-electrical components may be housed in the interior cavity as well. Alternatively, electrical components may be housed with the power source 1320 on the interior side 1314 of the front panel 1310. Positioning of the power source 1320 on the interior side 1314 of the front panel 1310 allows for smaller handles to be used on cabinets, as compared to the above-described door handle implementations.

The interior cavity 1304 may have an opening to allow access to the components stored within it. As discussed above with respect to door handles, the handle 1300 may also include an at least semi-translucent cover to substantially enclose the interior cavity and the components. The opening to the interior cavity and the at least semi-translucent cover may be on a face of the handle body 1302 that faces away from the front panel 1310, or they may be on a face of the handle body 1302 that faces toward the front panel 1310. The opening and the cover may additionally be on a face of the handle body 1302 that faces in a different direction.

As in previous embodiments, the electrical components associated with the handle 1300 cooperate to selectively produce light that may illuminate the handle 1300 and/or the front panel 1310. The electrical components may include an LED, a light sensor circuit, and a printed circuit board. In alternative embodiments, additional electrical components may be included. In embodiments, the printed circuit board is electrically connected to the other electrical components, and the power source provides power for the components. The light sensor circuit monitors for ambient light. When the light sensor circuit detects that the amount of ambient light is below a set threshold, it transitions the LED into an active state. While the LED is in the active state, the LED may turn on to emit light. This light is emitted through the at least semi-translucent cover and may illuminate the handle 1300 and/or the front panel 1310. In further embodiments, the LED and the cover may be configured such that substantially all of the cover is illuminated by the LED.

Figure 14:
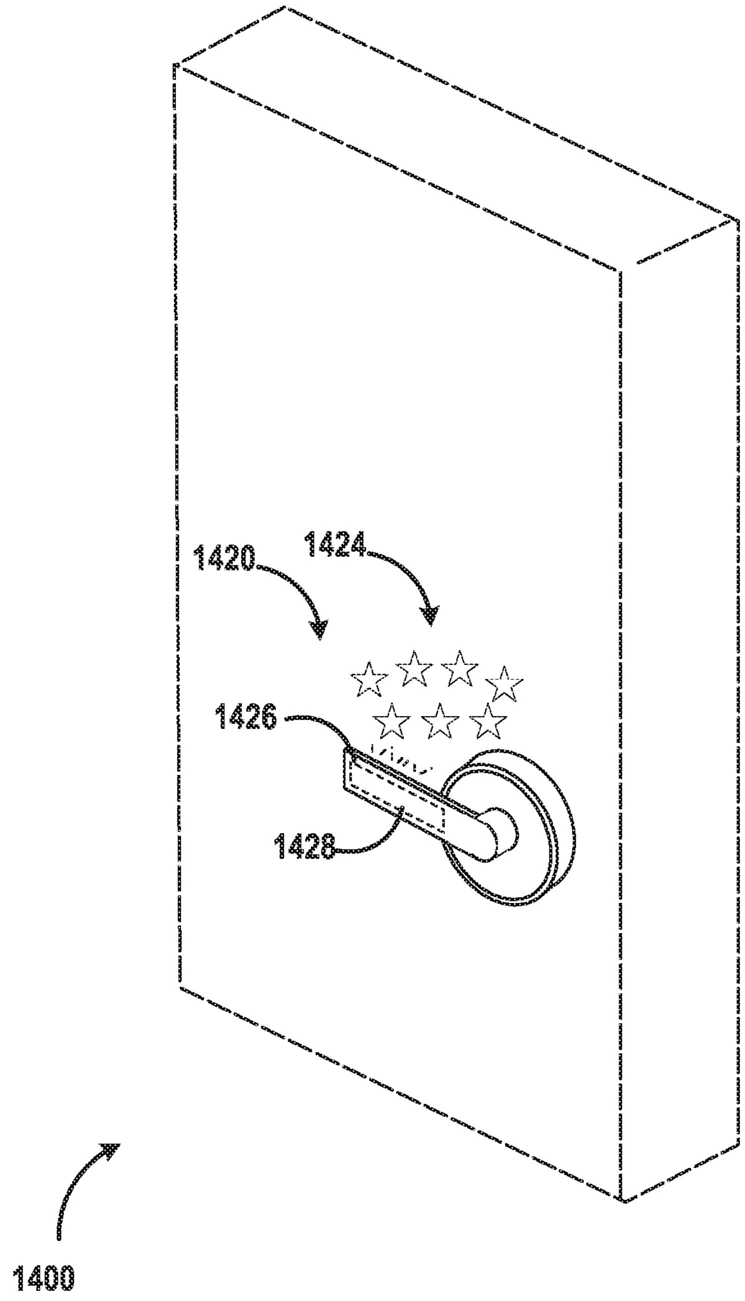
FIG. 14 illustrates a perspective view of a door having a handle mounted on a face of the door, the handle projecting a decorative pattern onto the door.

Turning now to FIG. 14, an embodiment of a handle 1400 configured to project a pattern onto a door is shown. The handle 1400 is analogous to handles 20, 40 of FIG. 1, and has a handle body 1426 with an interior cavity 1428. The handle body 1426 is elongated, the elongated portion of the handle body 1426 running substantially parallel to a surface of the door. The interior cavity 1428 of the handle 1400 has an opening on a face of the handle body 1426 along the elongated portion and facing the door. As in previous embodiments, the handle 1400 also has an at least semi-translucent cover to substantially enclose the interior cavity.

The handle 1400 has electrical components, as previously described. However, relative to those previous embodiments, in the example shown, the handle 1400 includes an at least semi-translucent cover (e.g., in place of cover 210, 310, 410, etc.), which has an at least semi-opaque decorative pattern 1424. When light from the LED is emitted through the cover, the decorative pattern 1424 is projected onto the door. In an alternative embodiment, a filter with an at least semi-opaque decorative pattern 1424 is used. When light from the LED is emitted through the filter, the decorative pattern 1424 is projected onto the door. In an embodiment, the filter is inserted between the LED and the cover. In an alternative embodiment, the filter is attached outside of the cover. Additionally, filters can be used to change the color of the light projected.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A door handle comprising:

a handle body operatively attachable to a spindle of a handleset, the handle body having a grippable portion and, when installed at a door, being rotatable to move a latch between an extended position and a retracted position;

an interior cavity within the handle body, the interior cavity having an opening;

a battery housed within the interior cavity;

an illumination circuit comprising:

a light sensor circuit;

a light-emitting diode; and a control circuit electrically connected to the battery, the light sensor circuit, and the light-emitting diode, wherein the control circuit activates the light-emitting diode for at least a portion of time during which the light sensor circuit indicates that ambient light is below a threshold, and maintains the light-emitting diode in an inactive state in response to the light sensor circuit indicating that ambient light is above the threshold, wherein the light-emitting diode is illuminated during at least a portion of time the light-emitting diode is operated in an activatable state; and an at least semi-translucent cover configured to cooperate with the opening and substantially enclose the illumination circuit within the interior cavity, the light-emitting diode being positioned to emit light through the at least semi-translucent cover.

2. The door handle of claim 1, wherein the light-emitting diode is illuminated for a predetermined amount of time.

3. The door handle of claim 1, further comprising a wireless network interface operatively connected to the control circuit and configured to communicate wirelessly with a mobile device.

4. The door handle of claim 3, wherein the control circuit comprises a controller, wherein the controller changes one or more settings of the door handle in response to the wireless network interface receiving a signal from the mobile device.

5. The door handle of claim 3, further comprising a motion sensor.

6. The door handle of claim 5, wherein the motion sensor is located on a portion of the handle body facing away from the door when the handle body is installed at the door.

7. The door handle of claim 5, wherein the control circuit receives a signal from the motion sensor indicative of motion detected in proximity to the motion sensor.

8. The door handle of claim 7, wherein the control circuit activates the light-emitting diode in response to receiving a signal originating from the light sensor circuit indicating that ambient light is below the threshold and receiving the signal originating from the motion sensor.

9. The door handle of claim 1, wherein:

the handle body further comprises a second cavity, the second cavity having an opening and a bridge, wherein the bridge partially covers the opening of the second cavity; and the at least semi-translucent cover comprises an at least partially flexible appendage configured to slide along the second cavity of the handle body, the at least partially flexible appendage engaging with the bridge of the second cavity to removably attach the at least semi-translucent cover to the handle body.

10. The door handle of claim 1, wherein:

the interior cavity further comprises an indentation along a first wall of the interior cavity; and the at least semi-translucent cover comprises:

a tab configured to fit inside the indentation of the interior cavity; and an at least partially flexible hook, the at least partially flexible hook configured to apply pressure against a second wall of the interior cavity, whereby when the tab of the at least semi-translucent cover is inserted inside of the indentation of the interior cavity and pressure from the at least partially flexible hook is applied against the second wall of the interior cavity, the at least semi-translucent cover becomes removably attached to the handle body.

11. The door handle of claim 1, wherein the interior cavity further comprises:

a retaining clip on a first wall of the interior cavity, the retaining clip configured to engage with a notch in the at least semi-translucent cover; and a spring assembly on a second wall of the interior cavity configured to press against the at least semi-translucent cover and manage engagement between the retaining clip and the notch in the at least semi-translucent cover, removably attaching the at least semi-translucent cover to the handle body.

12. The door handle of claim 1, wherein:

the opening of the interior cavity comprises threads; and the at least semi-translucent cover includes a threaded portion configured to engage with the threads of the opening of the interior cavity, removably attaching the at least semi-translucent cover to the handle body.

13. The door handle of claim 1, wherein the at least semi-translucent cover has an at least semi-opaque decorative pattern, whereby the at least semi-opaque decorative pattern is projected when the light-emitting diode emits light through the at least semi-translucent cover.

14. A door handle comprising:

a handle body operatively attachable to a spindle of a handleset, the handle body having a grippable portion and, when installed at a door, being rotatable to move a latch between an extended position and a retracted position;

an interior cavity within the handle body, the interior cavity housing a battery, a light sensor circuit, a light-emitting diode, and a printed circuit board, the printed circuit board electrically connected to the battery, the light sensor circuit, and the light-emitting diode, wherein the light-emitting diode is configured to operate in response to a signal originating from the light sensor circuit; and an at least semi-translucent cover configured to substantially enclose the interior cavity.

* * * * *